(12) United States Patent
DiTrolio

(10) Patent No.: US 12,692,889 B2
(45) Date of Patent: Jul. 28, 2026

(54) EXTENDABLE COUPLER ACCESSORY

(71) Applicant: Philip DiTrolio, Suwanee, GA (US)

(72) Inventor: Philip DiTrolio, Suwanee, GA (US)

( * ) Notice: Subject to any disclaimer, the term of this patent is extended or adjusted under 35 U.S.C. 154(b) by 0 days.

(21) Appl. No.: 19/055,242

(22) Filed: Feb. 17, 2025

(65) Prior Publication Data

US 2025/0188972 A1 Jun. 12, 2025

Related U.S. Application Data

(63) Continuation of application No. 18/122,186, filed on Mar. 16, 2023, now Pat. No. 12,234,846.

(60) Provisional application No. 63/320,887, filed on Mar. 17, 2022.

(51) Int. Cl.
| | |
|---|---|
| *F16B 12/40* | (2006.01) |
| *A47B 47/00* | (2006.01) |
| *F16B 12/44* | (2006.01) |

(52) U.S. Cl.
CPC .......... *F16B 12/40* (2013.01); *A47B 47/0008* (2013.01); *A47B 47/0016* (2013.01); *F16B 2012/446* (2013.01); *Y10T 403/341* (2015.01)

(58) Field of Classification Search
CPC ... E04B 1/2403; F16B 2012/446; F16B 12/40
See application file for complete search history.

(56) References Cited

U.S. PATENT DOCUMENTS

| | | | | |
|---|---|---|---|---|
| 1,015,448 | A | * | 1/1912 | Madden ................... F16B 12/40 |
| | | | | 211/206 |
| 1,064,734 | A | | 6/1913 | Howe |

| | | | | |
|---|---|---|---|---|
| 1,199,553 | A | | 9/1916 | Hogan |
| 1,278,348 | A | | 9/1918 | Hines |
| 1,710,468 | A | | 4/1929 | Louis |
| 1,893,702 | A | | 1/1933 | Glenn |
| 2,261,505 | A | * | 11/1941 | Schlesinger .......... F16B 7/1436 |
| | | | | 285/298 |
| 2,689,103 | A | | 9/1954 | Ackerman |
| 3,014,717 | A | | 12/1961 | Borodin et al. |
| 3,069,189 | A | | 12/1962 | Hollaender |
| 3,469,810 | A | | 9/1969 | Dorris |

(Continued)

FOREIGN PATENT DOCUMENTS

| | | |
|---|---|---|
| CH | 483819 A | 1/1970 |
| DE | 102004059072 A1 | 6/2006 |

(Continued)

OTHER PUBLICATIONS

WO-2009084260-A1 translation (Year: 2009).*

(Continued)

*Primary Examiner* — Michael W Hotchkiss
(74) *Attorney, Agent, or Firm* — F. Brent Nix; Johnson, Marcou, Isaacs & Nix, LLC

(57) ABSTRACT

The extendable coupler accessory mounts on a coupler affixed to a vertical pipe. The extendable coupler accessory has a nested set of rods that are extendable into a horizontal cantilever position by an extension mechanism. The extendable coupler accessory has an adapter with a bridge that engages with the coupler and prevents the cantilevered rods from tipping vertically or twisting horizontally. The extendable coupler accessory when attached to the coupler by the bridge maintains a horizontal cantilever position with an affixed load.

10 Claims, 11 Drawing Sheets

(56) References Cited

U.S. PATENT DOCUMENTS

| | | | |
|---|---|---|---|
| 3,480,243 A | | 11/1969 | Summerville |
| 3,498,576 A | | 3/1970 | Alissandratos |
| 3,545,796 A | * | 12/1970 | Nicholls ............... E04G 7/22 403/187 |
| 3,547,475 A | * | 12/1970 | Gingher ............. F16B 7/0413 403/379.3 |
| 3,695,649 A | * | 10/1972 | Laverone ............. F16B 9/054 403/402 |
| 3,823,439 A | | 7/1974 | Selset |
| 3,902,817 A | | 9/1975 | Meir |
| 4,019,298 A | | 4/1977 | Johnson |
| 4,036,371 A | | 7/1977 | Michel |
| 4,261,138 A | | 4/1981 | St. George Syms |
| 4,283,035 A | | 8/1981 | Ojembarrena et al. |
| 4,361,314 A | | 11/1982 | Ohlson |
| D269,851 S | | 7/1983 | Kimura |
| 4,480,418 A | | 11/1984 | Ventrella |
| 4,627,210 A | | 12/1986 | Beaulieu |
| 4,723,384 A | | 2/1988 | Mengeringhausen et al. |
| 4,867,598 A | | 9/1989 | Winter |
| 4,951,438 A | | 8/1990 | Thoresen |
| 5,111,631 A | | 5/1992 | Flood et al. |
| 5,289,665 A | | 3/1994 | Higgins |
| 5,291,708 A | * | 3/1994 | Johnson ............... E04H 17/16 47/33 |
| 5,421,556 A | | 6/1995 | Dodge et al. |
| 5,433,416 A | | 7/1995 | Johnson |
| D363,977 S | | 11/1995 | Streit |
| D376,309 S | | 12/1996 | Takai |
| 5,657,913 A | | 8/1997 | Cucheran et al. |
| 5,667,178 A | | 9/1997 | Yang |
| 5,680,737 A | | 10/1997 | Sheipline |
| D391,477 S | | 3/1998 | Bennett |
| 5,769,292 A | | 6/1998 | Cucheran et al. |
| 5,802,798 A | | 9/1998 | Martens |
| 5,911,762 A | | 6/1999 | Ott |
| D423,994 S | | 5/2000 | Helwig |
| 6,216,889 B1 | | 4/2001 | Chang |
| 6,375,140 B1 | | 4/2002 | Shen |
| 6,375,164 B1 | | 4/2002 | Siegler et al. |
| 6,379,074 B1 | * | 4/2002 | Chin ............... F16B 7/0486 403/231 |
| 6,530,338 B2 | | 3/2003 | Okumura et al. |
| 6,588,713 B2 | | 7/2003 | Kilkenny |
| 6,595,496 B1 | | 7/2003 | Langlie et al. |
| 6,595,498 B1 | | 7/2003 | Andersen |
| 6,837,016 B2 | | 1/2005 | Simmons et al. |
| 6,840,482 B2 | | 1/2005 | Downey et al. |
| 6,952,905 B2 | | 10/2005 | Nickel et al. |
| 6,969,211 B2 | | 11/2005 | Altman |
| D526,950 S | | 8/2006 | Bareket |
| 7,198,088 B2 | | 4/2007 | Mcmenamin et al. |
| 7,343,831 B1 | | 3/2008 | Tamcsin |
| D576,024 S | | 9/2008 | Mazzocco |
| D585,531 S | | 1/2009 | Hamel et al. |
| 7,841,572 B2 | | 11/2010 | Chen et al. |
| 7,861,982 B1 | | 1/2011 | Mcclure |
| 8,020,328 B2 | | 9/2011 | Lavi et al. |
| 8,196,758 B2 | * | 6/2012 | Lee ............... A47B 47/03 403/182 |
| 8,209,924 B2 | | 7/2012 | Foley |
| 8,209,925 B2 | | 7/2012 | Foley |
| 8,231,093 B2 | | 7/2012 | Tran |
| 8,403,280 B2 | | 3/2013 | Halverson et al. |
| D684,962 S | | 6/2013 | Linhardt |
| 8,844,907 B1 | | 9/2014 | Davis et al. |
| 8,905,249 B2 | | 12/2014 | Whitacre |
| 8,925,238 B2 | | 1/2015 | Anderson |
| 9,082,324 B1 | | 7/2015 | Brown et al. |
| D737,131 S | | 8/2015 | Frandsen |
| 9,211,027 B2 | | 12/2015 | Ovist et al. |
| 9,271,593 B1 | | 3/2016 | Chang |
| 9,371,849 B2 | * | 6/2016 | Schaaf ............... F16B 7/0453 |
| 9,381,866 B2 | | 7/2016 | Sautter et al. |

| | | | |
|---|---|---|---|
| 9,388,837 B1 | | 7/2016 | Hanley |
| 9,890,506 B2 | | 2/2018 | Weiner |
| 9,909,271 B2 | | 3/2018 | Wiegel et al. |
| 9,931,993 B2 | | 4/2018 | Ward et al. |
| D819,789 S | | 6/2018 | Sith et al. |
| 10,024,348 B2 | * | 7/2018 | Schindler ............... F16B 12/50 |
| 10,035,677 B2 | | 7/2018 | Chen et al. |
| 10,702,085 B1 | | 7/2020 | Newport et al. |
| 10,765,247 B2 | | 9/2020 | Moss et al. |
| 10,935,070 B2 | | 3/2021 | Klein et al. |
| 11,066,870 B1 | | 7/2021 | Flannery et al. |
| 11,215,209 B2 | | 1/2022 | Ramey |
| 11,296,648 B1 | | 4/2022 | Jasmin et al. |
| D951,403 S | | 5/2022 | Semchuck |
| 11,627,824 B2 | | 4/2023 | Ditrolio |
| 2002/0063248 A1 | | 5/2002 | Siegler et al. |
| 2002/0096610 A1 | | 7/2002 | Fernandez |
| 2002/0162929 A1 | | 11/2002 | Downey et al. |
| 2002/0178998 A1 | | 12/2002 | Okumura |
| 2003/0037662 A1 | | 2/2003 | Hsieh |
| 2005/0023403 A1 | | 2/2005 | Lu |
| 2005/0095062 A1 | | 5/2005 | Iverson et al. |
| 2005/0098272 A1 | | 5/2005 | Rizzo |
| 2006/0165482 A1 | | 7/2006 | Olberding |
| 2006/0278777 A1 | | 12/2006 | Atkinson et al. |
| 2007/0210293 A1 | | 9/2007 | Cheng |
| 2008/0224470 A1 | | 9/2008 | Erez et al. |
| 2008/0245486 A1 | | 10/2008 | Brown |
| 2012/0005870 A1 | | 1/2012 | Ovist et al. |
| 2012/0234990 A1 | | 9/2012 | Lewis |
| 2013/0220188 A1 | * | 8/2013 | Wei Siao ............... A47B 13/02 108/158.11 |
| 2014/0082898 A1 | | 3/2014 | Maunder |
| 2014/0294500 A1 | * | 10/2014 | Schaaf ............... H02B 1/301 403/403 |
| 2015/0230648 A1 | | 8/2015 | Richards et al. |
| 2015/0240515 A1 | | 8/2015 | Davis et al. |
| 2015/0241174 A1 | | 8/2015 | Silvennoinen |
| 2016/0223000 A1 | | 8/2016 | Aninos |
| 2016/0363150 A1 | * | 12/2016 | Schindler ............... F16B 12/50 |
| 2017/0167516 A1 | | 6/2017 | Mason |
| 2017/0349080 A1 | | 12/2017 | Sautter et al. |
| 2018/0080489 A1 | * | 3/2018 | Kil ............... F16B 12/48 |
| 2018/0119410 A1 | | 5/2018 | Ditrolio |
| 2020/0383509 A1 | | 12/2020 | Ditrolio |
| 2021/0015259 A1 | * | 1/2021 | Endelman ............... F16B 12/52 |
| 2021/0068576 A1 | | 3/2021 | Ditrolio |
| 2022/0136187 A1 | | 5/2022 | Thenemann et al. |

FOREIGN PATENT DOCUMENTS

| | | | | |
|---|---|---|---|---|
| DE | 202006001094 U1 | | 6/2006 | |
| DE | 202009009455 U1 | | 9/2009 | |
| DE | 202012004360 U1 | | 10/2012 | |
| EP | 1384903 A1 | | 1/2004 | |
| EP | 1850045 A1 | | 10/2007 | |
| EP | 2410098 B1 | | 3/2016 | |
| FR | 2546953 A1 | | 12/1984 | |
| GB | 2302852 A | | 2/1997 | |
| WO | 2006077015 A1 | | 7/2006 | |
| WO | WO-2009084260 A1 | * | 7/2009 | ............... E04B 2/761 |
| WO | 212295405 A1 | | 1/2021 | |
| WO | 2021010592 A1 | | 1/2021 | |

OTHER PUBLICATIONS

"Advisory Action in U.S. Appl. No. 18/122,186, filed Mar. 16, 2023", mailed Sep. 9, 2024, 5 pages.
"Castletop Valance hanger", Jul. 20, 2020, 3 pages.
"Event Decor direct valance hanger topper", Nov. 20, 21, 8 pages.
"Final Office Action cited in U.S. Appl. No. 17/031,274, filed Sep. 24, 2020", 41 pages.
"Final Office Action cited in U.S. Appl. No. 17/099,534, filed Nov. 16, 2020", 30 pages.
"Final Office Action in U.S. Appl. No. 15/727,695, filed Oct. 9, 2017", mailed Aug. 21, 2020, 15 pages.
"Final Office Action in U.S. Appl. No. 16/931,556", mailed Jul. 20, 2022, 39 pages.

(56) References Cited

OTHER PUBLICATIONS

"Final Office Action in U.S. Appl. No. 17/188,230, filed Mar. 1, 2021", mailed Oct. 11, 2023, 30 pages.

"Final Office Action In U.S. Appl. No. 18/122,186, filed Mar. 16, 2023", mailed Jun. 4, 2024, 23 pages.

"Non-Final Office Action cited in U.S. Appl. No. 17/188,118, filed Mar. 1, 2021", mailed Apr. 11, 2023, 25 pages.

"Non-Final Office Action cited in U.S. Appl. No. 18/122,186, filed Mar. 16, 2023", 37 pages.

"Non-Final Office Action in U.S. Appl. No. 17/099,534, filed Nov. 16, 2020", mailed Oct. 24, 2023, 80 pages.

"Non-Final Office Action in U.S. Appl. No. 17/031,274, filed Sep. 24, 2020", mailed Oct. 19, 2023, 70.

"Non-Final Office Action issued in U.S. Appl. No. 16/931,556, filed Jul. 17, 2020", 15 pages.

"Non-Final Office Action issued in U.S. Appl. No. 16/931,556, filed Jul. 17, 2020", mailed Jan. 26, 2022, 33 pages.

"Non-Final Office Action issued in U.S. Appl. No. 17/188,230, filed Mar. 1, 2021", 24 Pages.

"Non-Final Office Action issued in U.S. Appl. No. 17/188,230, filed Mar. 1, 2021", mailed Apr. 14, 2023, 81 pages.

"Non-Final Office Action issued in U.S. Appl. No. 29/739,477, filed Jun. 25, 2020", mailed Jul. 19, 2023, 37 pages.

"Notice of Allowability in U.S. Appl. No. 18/122,186, filed Mar. 16, 2023", mailed Oct. 29, 2024, 16 pages.

"Notice of Allowance issued in U.S. Appl. No. 16/931,556, filed Jul. 17, 2020", 19 Pages.

"Notice of Allowance issued in U.S. Appl. No. 29/739,477, filed Jun. 25, 2020".

"Office Action in U.S. Appl. No. 15/727,695, filed Oct. 9, 2017", mailed Mar. 4, 2020, 16 pages.

* cited by examiner

10

300

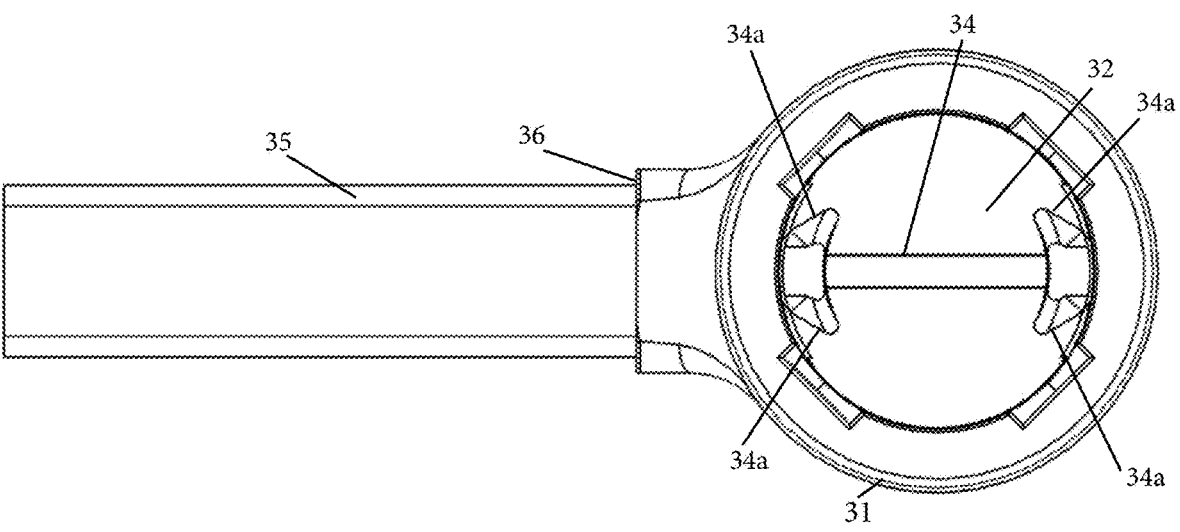
Figure 7
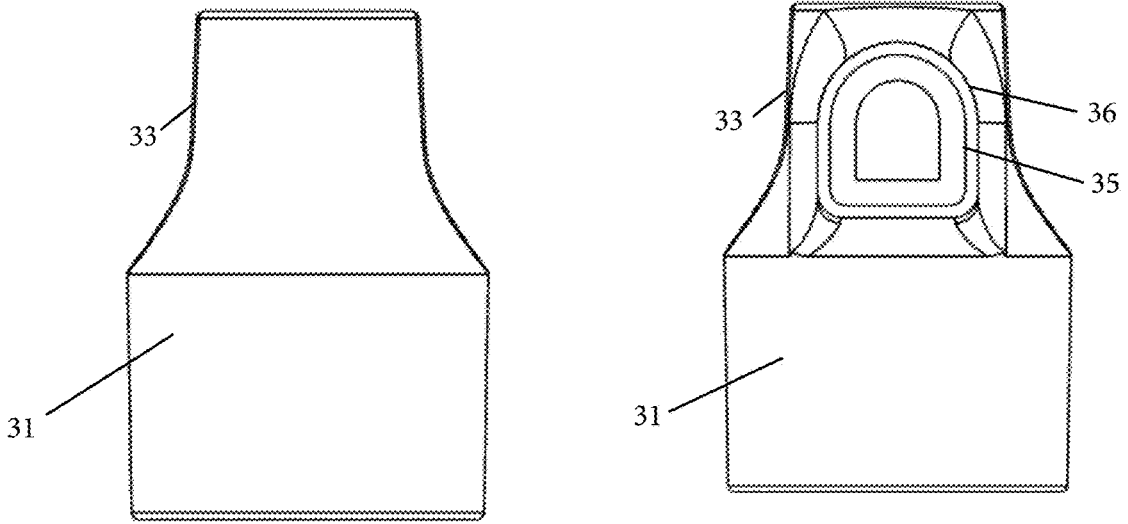
Figure 8                                    Figure 9

EXTENDABLE COUPLER ACCESSORY

CROSS REFERENCE TO RELATED APPLICATIONS

This application is a continuation of and claims priority to U.S. patent application Ser. No. 18/122,186, filed on Mar. 16, 2023, and entitled "Extendable Coupler Accessory," which claims priority to U.S. Provisional Patent Application No. 63/320,887, filed Mar. 17, 2022, and entitled "Extendable Coupler Accessory." The entire contents of the above-identified applications are hereby fully incorporated herein by reference.

FIELD OF INVENTION

The present invention relates to couplers for drape rods of the type typically found in exhibit booths. In even greater particularity, the present invention relates to an extendable coupler accessory to affix to a coupler, which is affixed to an end of a vertical pipe to allow accessories to be mounted.

BACKGROUND

In the prior art, exhibit booths and the like are constructed using a tubular framework supporting drapes as walls and or covers. Many of these booths are constructed using hook-and-slot systems, which utilize upright aluminum poles with slots formed near the top regions thereof for receiving hooks secured to and extending from the ends of horizontally-positioned tubular rods. Draping material is placed over the horizontal rods to form booths or partitions as may be required. Pipe and drape walls traditionally have a "bumpy" appearance due to the height difference of the vertical members in relation to the top of horizontally disposed connecting rods. Additionally, the steel hooks on industry standard horizontal drape rods have a tendency toward "tearing" the aluminum vertical uprights in a "can opener" effect when the steel hooks are inserted in the existing slots in the uprights. Further, industry standard horizontal drape rods require vertical supports on both ends of the drape rods. Past attempts to solve these problems involve proprietary connectors that are not compatible with the standard steel hooks.

SUMMARY OF THE INVENTION

An object of the invention is to enable the industry standard hooks on horizontal rods and other accessories to rest at such a height as to provide uniform appearance to the top of drape walls. A further object is to allow a connection adaptor to mount on a pipe or rod vertical end to allow one or more accessory connections to be affixed to the vertical pipe. A further object is to allow multiple horizontal rods to be mounted in parallel from a single vertical pipe.

A further object is to prevent the steel hooks on industry standard horizontal drape rods from "tearing" into the support pipes. Yet another object of the invention is to affix accessories for the industry standard hooks to be inserted at a wider angle of insertion and to allow easier connection as compared to the narrow industry standard slots.

A further object of the invention is to allow an extendable coupler accessory to be affixed to the coupler such that the extendable coupler accessory mounts via a bridge within existing notches or openings of the coupler while still allowing horizontal rods to be attached to the coupler. The extendable coupler accessory is configured with an extendable rod that can extend, and retract, horizontally in a cantilever type fashion to function as a horizontal drape rod with a customizable length without the need for vertical pipe supports on opposing ends. A still further object of the invention is to accomplish the foregoing objects using industry standard fasteners or hooks.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

Referring to the drawings, which are appended hereto and which form a portion of this disclosure, it may be seen that:

FIG. 7 is a bottom plan view of one embodiment of the extendable coupler accessory.

FIG. 8 is a back plan view of one embodiment of the extendable coupler accessory.

FIG. 9 is a front plan view of one embodiment of the extendable coupler accessory.

DETAILED DESCRIPTION

Figure 1:
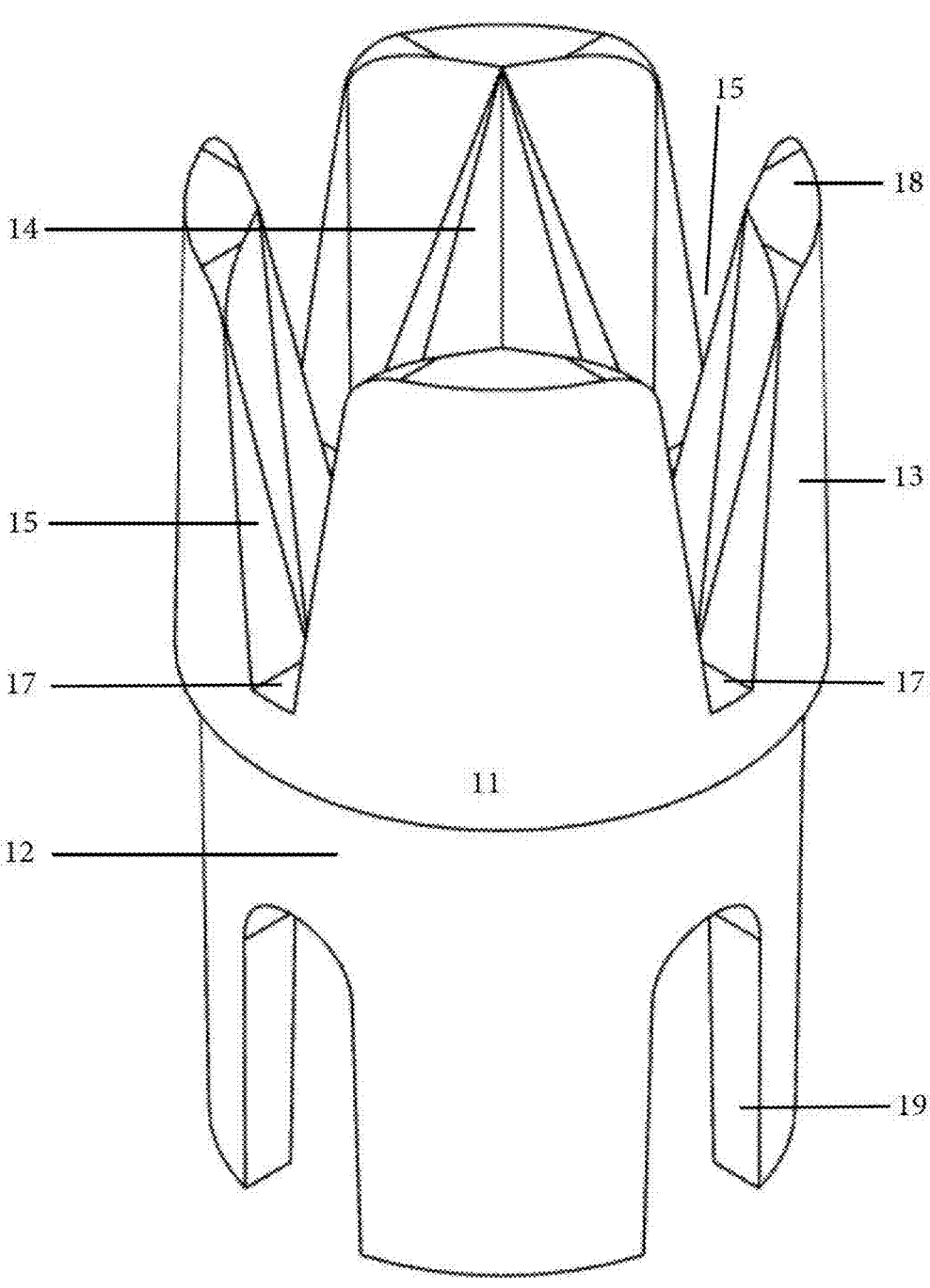
FIG. 1 is a perspective view of one embodiment of a pipe-mounted coupler.

Referring to the Figures for a clearer understanding of the invention, one or more of the above objects of the invention can be achieved, at least in part, by providing an extendable coupler accessory 300 to affix to pipe-mounted couplers 10 in a pipe and drape exhibit booth construction. The example embodiments described herein provide an extendable coupler accessory 300 configured with an extendable rod 35 that can extend, and retract, horizontally in a cantilever type fashion to function as a horizontal drape rod with a customizable length. The extendable coupler accessory 300 mounts via a bridge 34 within existing notches or openings 15 of the coupler 10 while still allowing horizontal rods 22 to be attached to the coupler. The "Pipe and Drape" industry is a subset of exhibition and convention services in which frameworks are constructed from horizontally and vertically disposed members in such a fashion to allow draperies or curtains to hang and create division of space in convention halls or other similar areas by arranging drapery walls and booths. The extendable coupler accessory 300 is designed to provide an improvement to form and function over the industry standard hook and slot technology yet allowing users of existing systems to continue using their inventory of components.

FIG. 1 is a perspective view of one embodiment of a pipe-mounted coupler 10, in accordance with certain examples. The coupler 10 is used to construct the aforesaid pipe and drape booths. Because the steel terminal hooks traditionally used on the transverse rods in conventional systems to connect to the vertical member or a wall are used to connect to the instant coupler 10, the steel hooks are not illustrated. Coupler 10 has a body 11 and an upper region 13. The body 11 may be substantially circular. In alternate embodiments, the body 11 is another shape, such as square, hexagonal, or oblong. The upper region 13 may be of a similar outside dimension as the body 11 and/or of similar shape as the body 11. In an example, the upper region 13 is affixed to the body 11 or is molded, cast, or otherwise formed as a solitary piece or unit. In an internal portion of the coupler 10, at least one hollow well 14 opens vertically with at least one lateral notch or opening 15 formed in upper region 13 and designed to accept a terminal hook used on an end of a horizontally placed rod. The coupler 10 may include any number of openings 15, such as 1, 3, 4, or 8. Examples herein illustrate a coupler 10 that has four openings 15 disposed at 90-degree positions on the upper region 13. For example, the openings 15 are positioned at 3:00, 6:00, 9:00, and 12:00. In examples, one or more of the openings 15 are replaced by a connection bridge or other connection hardware.

The hollow well 14 may be an open space surrounded continuously or discontinuously by the upper region 13. The hollow well 14 is open at a top portion to receive terminal hooks. The coupler 10 may be hollow such that the upper region 13 and the body 11 are formed as hollow rings without a floor. Alternatively, the coupler 10 may have a floor formed within.

The opening 15 is preferably formed in the upper region 13 with a wider upper dimension that tapers to a narrower seat 17 at the bottom of opening 15. The seat 17 is positioned at a height above an internal floor, if present, of the hollow well 14 to allow industry standard terminal hooks to rest on the seat 17 within opening 15 and hollow well 14 such that, when used as a rod and drape booth framework, the drapery walls have a uniform, flat appearance and the hooks are securely retained in the opening 15. Upper region 13 has a thickness at seat 17 that is sufficient to engage and retain the terminal hooks of the horizontal rods.

The top surfaces 18 of the coupler 10 are preferably rounded but may be beveled or flat. Similarly, the tapering surfaces of opening 15 may be beveled, rounded, or flat. Beveled, rounded, or other surfaces on the top surfaces 18 and the opening 15 may be used to facilitate the sliding of the terminal hooks into the opening 15.

The coupler 10 illustrated in FIG. 1 has an affixed base region 12 on the lower region of the coupler 10. The base region 12 allows the coupler 10 to be inserted into an opening in the top of a vertical pipe or tube or around the opening. The base region 12 may have downwardly opening slots 19 which align with the traditional slots formed in standard vertical members to allow the slots on industry standard poles to remain usable when the coupler 10 is inserted into a standard support pipe. The slots 19 may have square, rounded or beveled edges and may include a web of material closing the lower end of the slot. The base region

12 may have a lattice or matrix structure to reduce raw material usage, reduce weight, and improve strength.

Preferably, coupler 10 will be made from durable reinforced polymer material, acrylonitrile butadiene styrene plastic, Delrin, polyurethane, or some other suitable material that has sufficient strength and rigidity to effectuate the connection.

Figure 2:
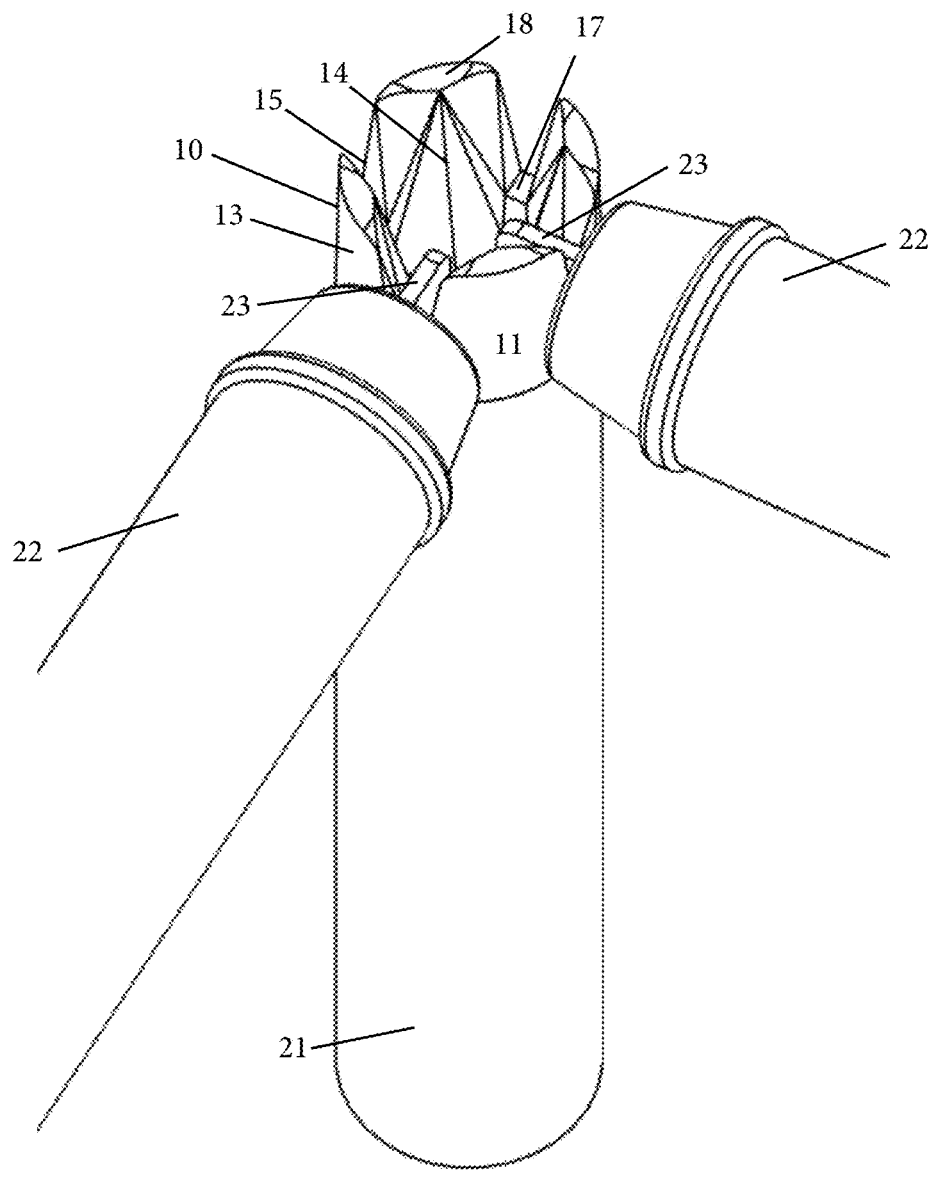
FIG. 2 is a perspective view of one embodiment of industry standard horizontal drape rods affixed to the pipe-mounted coupler.

FIG. 2 is a perspective view of one embodiment of industry standard horizontal drape rods 22 affixed to the pipe-mounted coupler 10, in accordance with certain examples. FIG. 2 depicts coupler 10 inserted into an opening in the top of a vertical pipe 21. Horizontal rods 22 with terminal hooks 23 are depicted resting on seats 17 within openings 15. While two horizontal rods 22 are depicted, any suitable number of horizontal rods 22 may be affixed to coupler 10 by terminal hooks 23 resting on seats 17 within openings 15.

Figure 3:
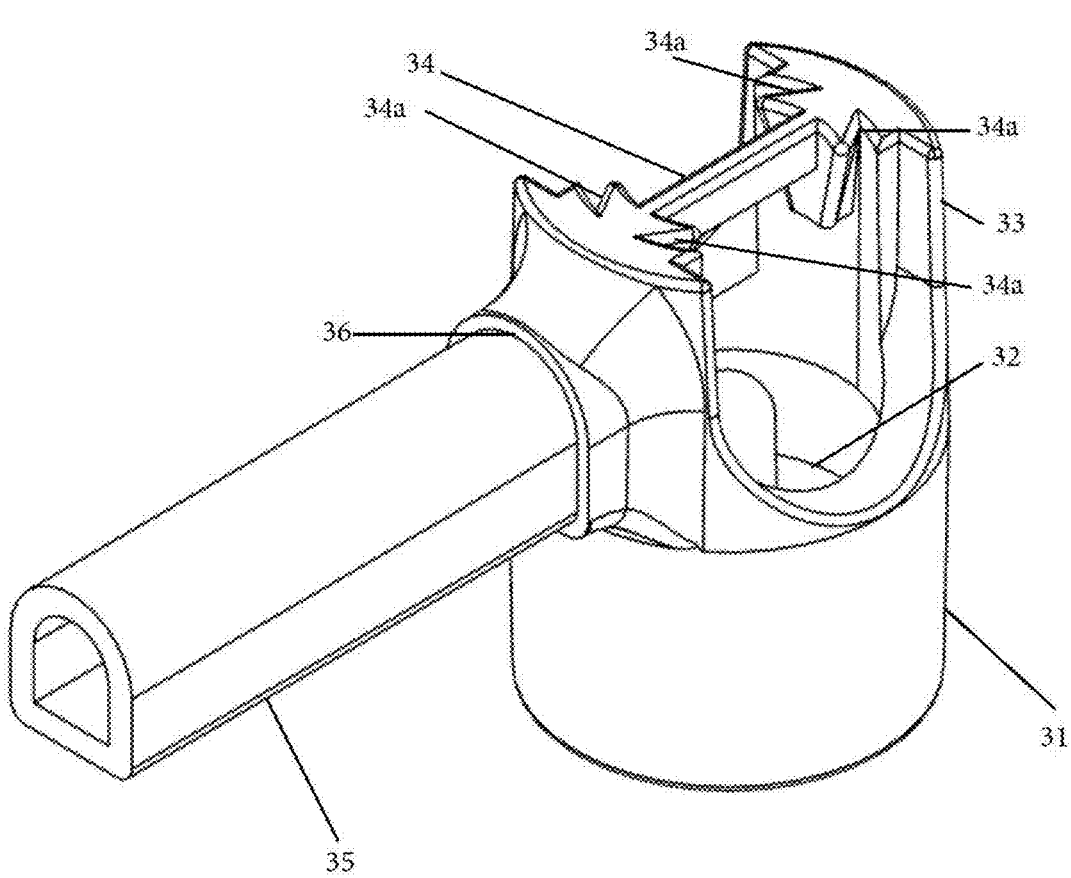
FIG. 3 is a top perspective view of one embodiment of the extendable coupler accessory.
Figure 10:
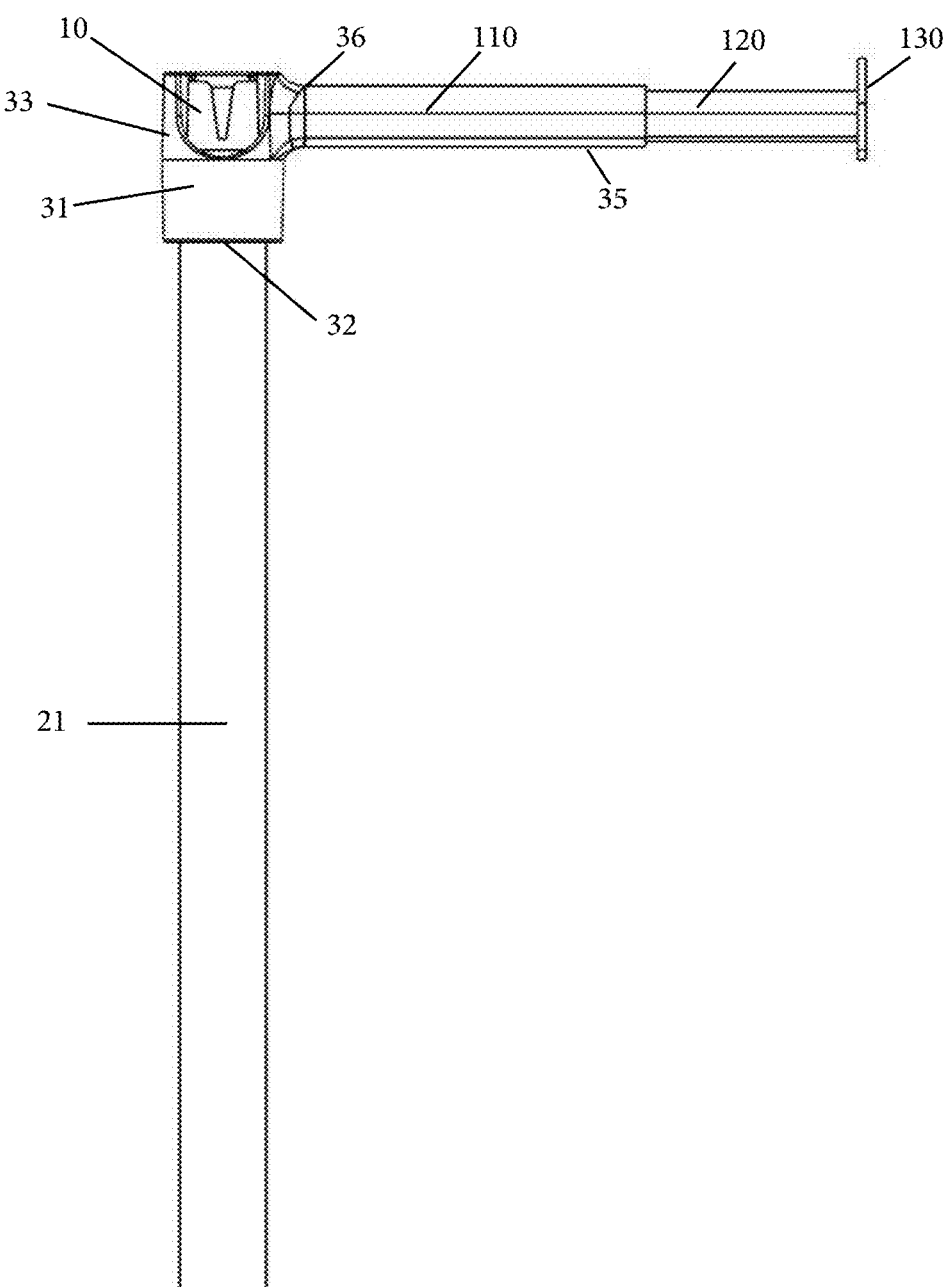
FIG. 10 is a side perspective view of one embodiment of the extendable coupler accessory in an extended position.
Figure 11:
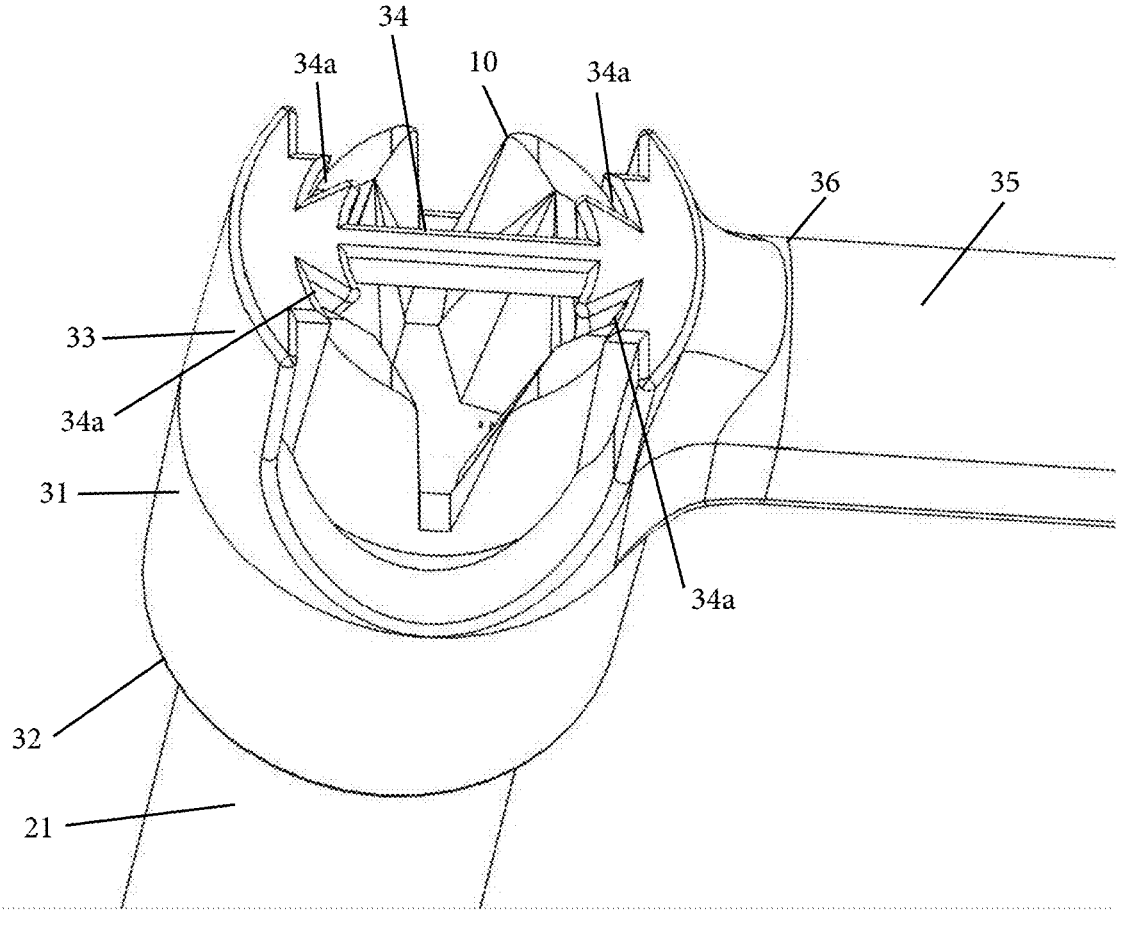
FIG. 11 is a top perspective view one embodiment of the extendable coupler accessory affixed to a pipe-mounted coupler.

FIG. 3 is a top perspective view of one embodiment of the extendable coupler accessory 300, in accordance with certain examples. In an example embodiment, and as depicted in FIG. 3, the extendable coupler accessory 300 comprises an adaptor 31 with a bottom opening 32, an upper adapter region 33, and a bridge 34 with bridge notches 34*a*; and an extendable rod 35 affixed to adapter 31 via adapter opening 36. The adaptor 31 is configured to mate with a coupler 10, depicted in FIG. 1. In an example, coupler 10 affixed to a vertical pipe 21 (as depicted in FIGS. 10-11) slides into bottom opening 32 upwardly into upper adapter region 33 such that coupler 10 engages with bridge 34 via bridge notches 34*a*. In an example, each end of bridge 34 comprises one or more bridge notches 34*a*. In an example, each bridge notch 34*a* has an inner portion and an outer portion to mate with an inner surface and an outer surface of the sides of opening 15 of the coupler 10. When coupler 10 slides upward into upper adapter region 33, each end of bridge 34 via bridge notches 34*a* engages with the sides of opening 15 to secure the coupler 10 to the adapter 31 and accordingly the extendable coupler accessory 300. In an example, coupler 10 engages with bridge 34 such that bridge 34 rests upon seats 17 within openings 15. Bridge 34 may be of a rectangular shape or any suitable shape such that adaptor 31 may be engaged with, affixed to, or mated with the coupler 10. In an example embodiment with the extendable coupler accessory 300 affixed to the coupler 10, additional openings 15 of the coupler 10 may be available, as depicted in FIG. 11. Additional horizontal rods 22 may be affixed in the available openings 15 of the coupler 10.

Preferably, adapter 31 will be made from a durable reinforced polymer material, acrylonitrile butadiene styrene plastic, Delrin, polyurethane, or some other suitable material that has sufficient strength and rigidity to effectuate the connection between a coupler 10 and extendable rod 35. In an example, adapter 31 with bottom opening 32, upper adapter region 33, bridge 34, and adapter opening 36 may be molded, cast, or otherwise formed as a solitary piece or unit. Alternatively, upper adapter region 33 and bridge 34 may be affixed or adhered to adapter 31 by screws, an adhesive, or any other connection method.

In an example embodiment, extendable rod 35 is affixed to adapter 31 via adapter opening 36. In an example, extendable rod 35 is affixed to adapter 31 via adapter opening 36 in a removable configuration. In an example, extendable rod 35 may comprise tabs, buttons, or other compressible mechanisms that latch or otherwise mate with notches or openings within adapter opening 36. In an alternate example, extendable rod 35 is affixed to adapter 31 via adapter opening 36 in a permanent or semi-permanent configuration. In an example, extendable rod 35 may be molded, welded, soldered, screwed, riveted, or glued into adapter opening 36. Any other suitable method to affix extendable rod 35 to adapter 31 via adapter opening 36 may be used.

Figure 12:
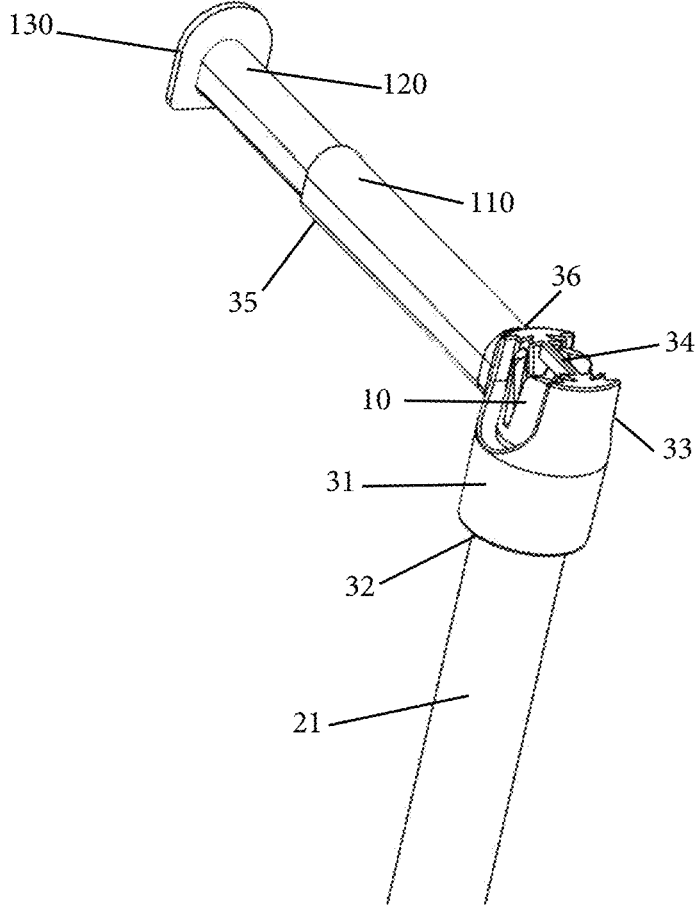
FIG. 12 is a side perspective view one embodiment of the extendable coupler accessory affixed to a pipe-mounted coupler in an extended position.
Figure 14:
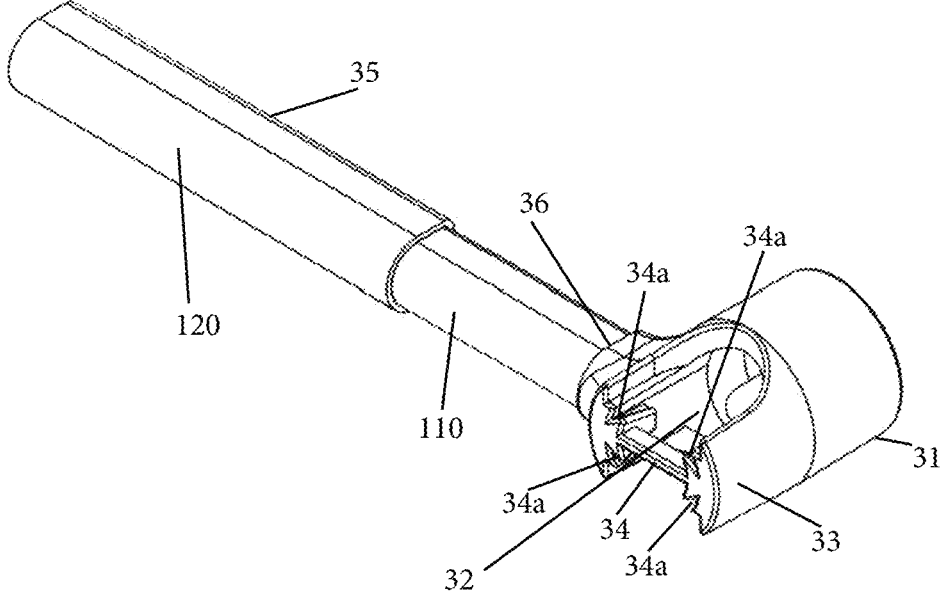
FIG. 14 is a side perspective view one embodiment of the extendable coupler accessory in an extended position.

In an example embodiment, the extendable rod 35 may function as a cantilever arm maintaining a substantially horizontal position when in an extended position with an affixed load, such as draperies or curtains that may hang from the extendable rod 35. In an example, extendable rod 35 comprises two or more rods that nest within each other when in a retracted position. In an example, an innermost rod of the two or more rods has smaller cross-sectional dimensions, i.e., a smaller width and height or diameter if circular, relative to a second innermost rod of the two or more rods such that the innermost rod can slide or retract, i.e., nest, into the second innermost rod. Each subsequent rod of the two or more rods has larger cross-sectional dimensions relative to an adjacent inner rod. In an example, as the length of extendable rod 35 is increased, the cross-sectional dimensions of the rods decrease in a direction extending away from extendable coupler accessory 300, as depicted in FIG. 12. In an alternate example, as the length of extendable rod 35 is increased, the cross-sectional dimensions of the rods increase in a direction extending away from extendable coupler accessory 300, as depicted in FIG. 14. In an example, the two or more rods are hollow with cross sections that may be arched, circular, c-shaped, u-shaped, rectangular, or any other suitable cross-sectional shape or configuration. In an example, the two or more rods may each be of an equivalent length. In an example, the two or more rods may be of differing lengths. In an example, a length of the extendable rod may be increased by unnesting the two or more rods. In an example, the length of the extendable rod 35 may be extended to any suitable length using an extension mechanism such as a telescopic mechanism, a screw mechanism, a spring mechanism, a guide cable, or any other suitable extension/retraction mechanism. In an example, each rod of the two or more rods comprises a stopping mechanism such that during extension each rod maintains contact with an adjacent rod relative to the nested configuration. In an example, the stopping mechanism provides strength and rigidity during extension of extendable rod 35. In an example, the stopping mechanism may be a flange, a ring, a linkage, an interlocking mechanism, a stop on screw threads, or any other suitable stopping mechanism. In an example, the extendable rod 35 may extend 2 feet, 5 feet, 10 feet, 20 feet, or any suitable length. In an example, after extension of extendable rod 35, extendable rod 35 may return to a retracted position with the two or more rods returning to a nested configuration. In an example, the two or more rods may return to the nested configuration by applying a compressive force to an end rod of the two or more rods of the extended rod 35. In an example, the extendable rod 35 may be retracted by reversing the extension mechanism.

In an example with a coupler 10 affixed to a vertical pipe 21 and coupler 10 engaged with bridge 34 (as previous described herein), when the extendable rod 35 is in an extended position, i.e., cantilevered, the engagement of the coupler 10 with the bridge 34 of the extendable coupler accessory 300 makes the extendable rod 35 secure from tipping vertically (i.e., extendable rod 35 maintains a substantially horizontal position) or twisting horizontally. An industry standard rod would fall if only secured on one side as described herein with the present example.

In an example, the two or more rods of extendable rod 35 may be made from steel, aluminum, polyvinyl chloride ("PVC"), a durable reinforced polymer material, acrylonitrile butadiene styrene ("ABS") plastic, Delrin, polyurethane, or any other suitable material that has sufficient strength and rigidity to maintain a substantially horizontal position when in an extended position while bearing the weight of an affixed load, such as the weight of draperies or curtains.

Figure 4:
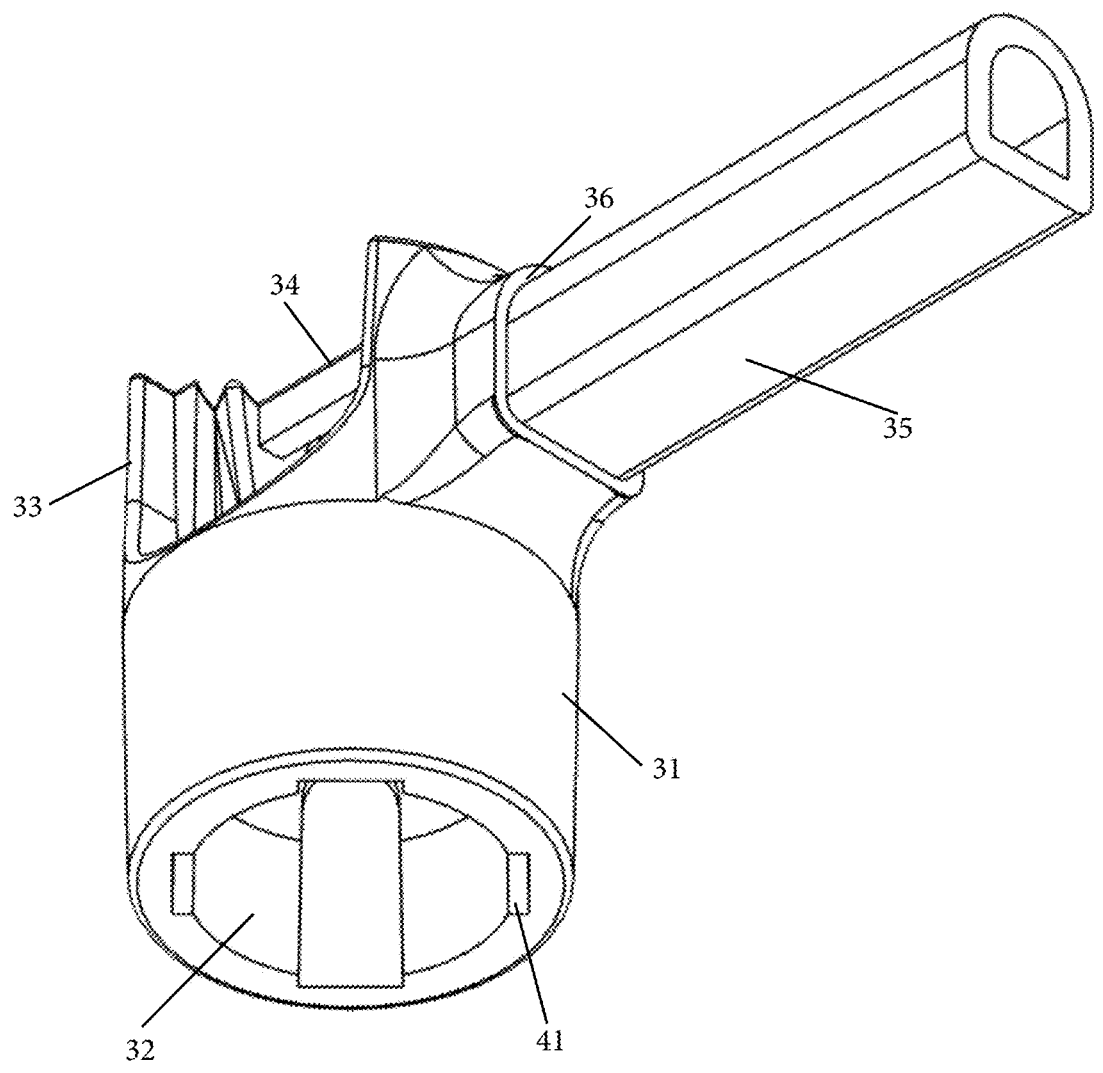
FIG. 4 is a bottom perspective view of one embodiment of an extendable coupler accessory.

FIG. 4 is a bottom perspective view of one embodiment of an extendable coupler accessory 300, in accordance with certain examples. FIG. 4 illustrates the extendable coupler accessory 300 with adaptor 31 with bottom opening 32, upper adapter region 33, and bridge 34; and extendable rod 35 affixed to adapter 31 via adapter opening 36, previously described herein with reference to FIG. 3. FIG. 4 depicts bottom opening 32 with at least one optional engagement element 41. Engagement element 41 may be a compressible element, such as a tab, a flap, or other suitable mechanism, to apply pressure to and further secure the coupler 10 vertical pipe 21 assembly to the extendable coupler accessory 300 when inserted into bottom opening 32.

Figure 5:
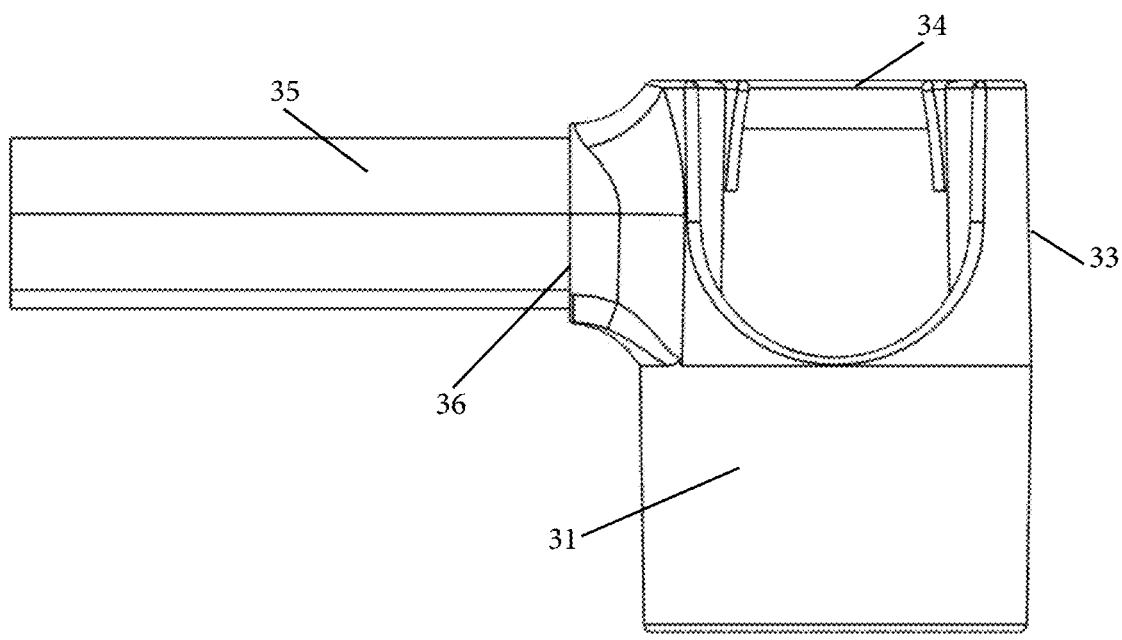
FIG. 5 is a side plan view of one embodiment of the extendable coupler accessory.

FIG. 5 is a side plan view of one embodiment of the extendable coupler accessory 300, in accordance with certain examples. FIG. 5 illustrates the extendable coupler accessory 300 with adaptor 31, upper adapter region 33, and bridge 34; and extendable rod 35 affixed to adapter 31 via adapter opening 36, previously described herein with reference to FIG. 3.

Figure 6:
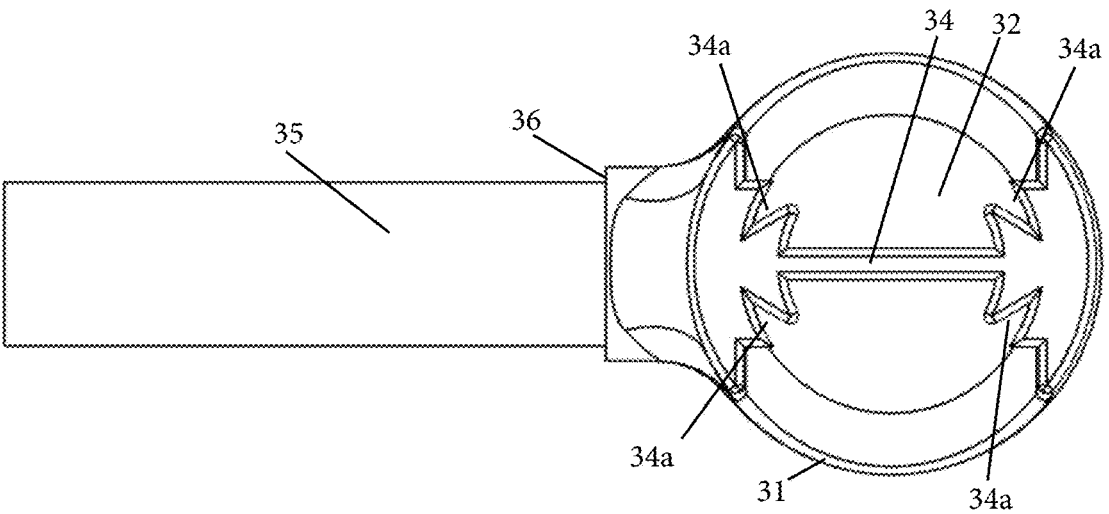
FIG. 6 is a top plan view of one embodiment of the extendable coupler accessory.

FIG. 6 is a top plan view of one embodiment of the extendable coupler accessory 300, in accordance with certain examples. FIG. 6 illustrates the extendable coupler accessory 300 with adaptor 31 with bottom opening 32, and bridge 34 with bridge notches 34a; and extendable rod 35 affixed to adapter 31 via adapter opening 36, previously described herein with reference to FIG. 3.

FIG. 7 is a bottom plan view of one embodiment of the extendable coupler accessory 300, in accordance with certain examples. FIG. 7 illustrates the extendable coupler accessory 300 with adaptor 31 with bottom opening 32, and bridge 34 with bridge notches 34a; and extendable rod 35 affixed to adapter 31 via adapter opening 36, previously described herein with reference to FIG. 3.

FIG. 8 is a back plan view of one embodiment of the extendable coupler accessory 300, in accordance with certain examples. FIG. 8 illustrates the extendable coupler accessory 300 with adaptor 31 and upper adapter region 33, previously described herein with reference to FIG. 3.

FIG. 9 is a front plan view of one embodiment of the extendable coupler accessory 300, in accordance with certain examples. FIG. 9 illustrates the extendable coupler accessory 300 with adaptor 31 with upper adapter region 33 and extendable rod 35 affixed to adapter 31 via adapter opening 36, previously described herein with reference to FIG. 3.

FIG. 10 is a side perspective view of one embodiment of the extendable coupler accessory 300 in an extended position, in accordance with certain examples. FIG. 10 illustrates coupler 10, vertical pipe 21, adapter 31, bottom opening 32, upper adapter region 33, extendable rod 35, and adapter opening 36 previously described herein with reference to FIGS. 1-3. FIG. 10 illustrates coupler 10 affixed to vertical pipe 21 and inserted into bottom opening 32 upwardly into upper adapter region 33 of adapter 31 such that coupler 10 engages with bridge 34 via bridge notches 34a (not depicted). Extendable rod 35 is depicted in an extended position as the two or more rods, depicted as rod 110 and rod 120, are extended from a nested position. While the two or more rods are depicted as two rods 110 and 120, any quantity of rods may extend from extendable rod 35, including, but not limited to, 3, 4, 5, 10, or more rods. In an example, the outer most extended rod, depicted in FIG. 10 as rod 120, is affixed to a stop 130. In an example, stop 130 can be engaged by a user to effect the extension mechanism, previously described herein, to extend extendable rod 35. In an example, stop 130 can be engaged by a user to effect the retraction mechanism, previously described herein, to retract extendable rod 35. In an example, stop 130 may prevent an affixed load from sliding off the end of extendable rod 35 when in an extended position.

FIG. 11 is a top perspective view one embodiment of the extendable coupler accessory 300 affixed to a pipe-mounted coupler 10, in accordance with certain examples. FIG. 11 illustrates the extendable coupler accessory 300 with adaptor 31 with bottom opening 32, upper adapter region 33, and bridge 34 with bridge notches 34a; and extendable rod 35 affixed to adapter 31 via adapter opening 36. The extendable coupler accessory 300 is engaged with coupler 10 affixed to vertical pipe 21, previously described herein with reference to FIGS. 1-3.

FIG. 12 is a side perspective view one embodiment of the extendable coupler accessory 300 affixed to a pipe-mounted coupler 10 in an extended position, in accordance with certain examples. FIG. 12 illustrates the extendable coupler accessory 300 with adaptor 31 with bottom opening 32, upper adapter region 33, and bridge 34; and extendable rod 35 affixed to adapter 31 via adapter opening 36. The extendable coupler accessory 300 is engaged with coupler 10 affixed to vertical pipe 21, previously described herein with reference to FIGS. 1-3. Extendable rod 35 is depicted in an extended position as the two or more rods, depicted as rod 110 and rod 120, are extended from a nested position, previously described herein with reference to FIG. 10. The outer most extended rod, depicted in FIG. 10 as rod 120, is affixed to stop 130. In an example and as depicted, as the length of extendable rod 35 is increased, the cross-sectional dimensions of the rods 110 and 120 decrease in a direction extending away from extendable coupler accessory 300.

Figure 13:
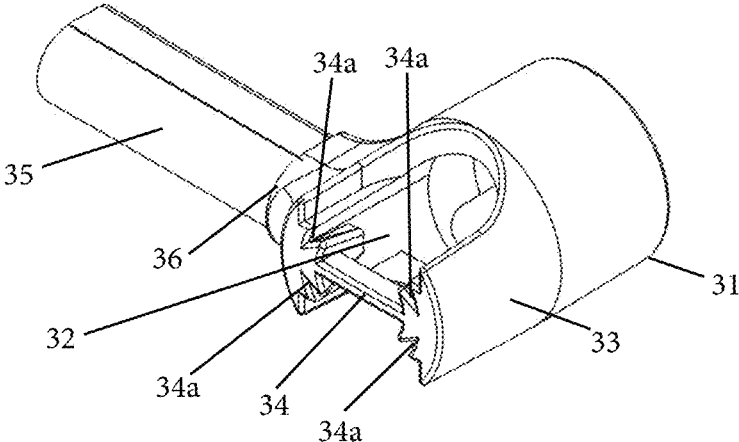
FIG. 13 is a side perspective view one embodiment of the extendable coupler accessory in a retracted position.

FIG. 13 is a side perspective view one embodiment of the extendable coupler accessory 300 in a retracted position, in accordance with certain examples. FIG. 13 illustrates the extendable coupler accessory 300 with adaptor 31 with bottom opening 32, upper adapter region 33, and bridge 34 with bridge notches 34a; and extendable rod 35 affixed to adapter 31 via adapter opening 36.

FIG. 14 is a side perspective view one embodiment of the extendable coupler accessory 300 in an extended position, in accordance with certain examples. FIG. 14 illustrates the extendable coupler accessory 300 with adaptor 31 with bottom opening 32, upper adapter region 33, and bridge 34 with bridge notches 34a; and extendable rod 35 affixed to adapter 31 via adapter opening 36. Extendable rod 35 is depicted in an extended position as the two or more rods, depicted as rod 110 and rod 120, are extended from a nested position, previously described herein with reference to FIG. 10. In an example and as depicted, as the length of extendable rod 35 is increased, the cross-sectional dimensions of the rods 110 and 120 increase in a direction extending away from extendable coupler accessory 300.

What is claimed is:

1. A system for mounting horizontal pipes to a vertical pipe, comprising:
   a coupler device, comprising:
      a rod, and
      an adapter coupled to the rod, comprising:
         an upper region comprising at least two opposing sides separated by openings,
         a bottom opening, and a bridge connecting the at least two opposing sides of the upper region and comprising notches on opposing ends; and
   a coupler comprising a plurality of upwardly opening slots spaced radially around a central opening of the coupler and configured to receive the notches on the bridge,
   wherein the notches are configured to engage with one or more sides of the upwardly opening slots, and
   wherein the coupler is configured to receive a terminal connector affixed to a particular horizontal pipe into a particular upwardly opening slot of the plurality of upwardly opening slots through a particular opening in the upper region of the adapter.

2. The system of claim 1, the adapter further comprising a hollow structure.

3. The system of claim 1, wherein each opening extends upward from a lower surface of the upper region.

4. The system of claim 1, wherein the bridge spans a central portion of a top opening of the upper region of the adapter.

5. The system of claim 1, wherein the bridge is an integral component of the adapter.

6. The system of claim 1, wherein the rod is an extendable rod comprising two or more rods in a nested configuration, each of the two of more rods comprising a stopping mechanism.

7. The system of claim 6, wherein the extendable rod comprises an extension mechanism comprising one or more of a telescopic mechanism, a screw mechanism, or a guide cable.

8. The system of claim 7, wherein the extension mechanism is reversable as a retraction mechanism.

9. A method for horizontal pipes to be mounted from a single vertical pipe, comprising:
   affixing a coupler to a vertical pipe, the coupler comprising a plurality of upwardly opening slots spaced radially around a central opening of the coupler;
   affixing a coupler device to the coupler, the coupler device comprising:
      a rod, and
      an adapter coupled to the rod, comprising:
         an upper region comprising at least two opposing sides separated by openings,
         a bottom opening, and
         a bridge connecting the at least two opposing sides of the upper region and comprising notches on opposing ends; and
   affixing one or more horizontal pipes to the coupler by inserting a terminal connector of a particular horizontal pipe into one of the plurality of upwardly opening slots through one of the openings of the upper region of the adapter.

10. The method of claim 9, wherein affixing the coupler device to the coupler comprises:
   positioning the coupler device above the coupler such that the notches of the bridge align with two of the plurality of upwardly opening slots disposed on opposing sides of the coupler; and
   inserting the notches of the coupler device into the two upwardly opening slots of the coupler.

\* \* \* \* \*